(12) United States Patent
Gorokhov et al.

(10) Patent No.: US 9,179,469 B2
(45) Date of Patent: Nov. 3, 2015

(54) ENABLING RESOURCE PARTITIONING FOR WIRELESS COMMUNICATION SYSTEMS

(75) Inventors: Alexei Gorokhov, San Diego, CA (US); Aamod Khandekar, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1239 days.

(21) Appl. No.: 11/877,617

(22) Filed: Oct. 23, 2007

(65) Prior Publication Data

US 2008/0188234 A1 Aug. 7, 2008

Related U.S. Application Data

(60) Provisional application No. 60/862,642, filed on Oct. 24, 2006, provisional application No. 60/863,121, filed on Oct. 26, 2006.

(51) Int. Cl.
*H04W 72/00* (2009.01)
*H04W 72/08* (2009.01)
*H04W 24/02* (2009.01)
*H04W 72/04* (2009.01)

(52) U.S. Cl.
CPC ............ *H04W 72/085* (2013.01); *H04W 24/02* (2013.01); *H04W 72/0406* (2013.01)

(58) Field of Classification Search
CPC ....... H04W 24/00; H04W 4/16; H04W 28/04; H04L 47/10
USPC .......... 455/452.2, 445, 436, 453, 452.1, 447, 455/450, 451; 370/235, 338, 334, 328
See application file for complete search history.

(56) References Cited

U.S. PATENT DOCUMENTS

| | | | | |
|---|---|---|---|---|
| 5,867,478 | A * | 2/1999 | Baum et al. | 370/203 |
| 7,564,829 | B2 * | 7/2009 | Jin et al. | 370/343 |
| 7,660,275 | B2 | 2/2010 | Vijayan et al. | |
| 2004/0166886 | A1 | 8/2004 | Laroia et al. | |
| 2004/0166887 | A1 | 8/2004 | Laroia et al. | |
| 2004/0179493 | A1 | 9/2004 | Khan | |
| 2005/0085236 | A1 * | 4/2005 | Gerlach et al. | 455/450 |
| 2005/0124347 | A1 * | 6/2005 | Hosein | 455/446 |
| 2005/0208837 | A1 | 9/2005 | Chou | |

(Continued)

FOREIGN PATENT DOCUMENTS

CN 1613201 5/2005
JP 2004297205 A 10/2004

(Continued)

OTHER PUBLICATIONS

International Search Report—PCT/US2007/082302, International Search Authority—European Patent Office—Apr. 3, 2008.

(Continued)

*Primary Examiner* — Chuck Huynh
(74) *Attorney, Agent, or Firm* — Howard Seo

(57) ABSTRACT

Enabling resource partitioning in a wireless communication is provided. A terminal can measure channel quality and other information in a wireless communication environment and prepare a VCQI report. The report can be transmitted to a serving base station and/or non-serving base stations. The report information can be utilized by the base stations to allocate resources and/or to facilitate handoff within the wireless communication environment.

26 Claims, 15 Drawing Sheets

(56) References Cited

U.S. PATENT DOCUMENTS

| | | | |
|---|---|---|---|
| 2005/0245278 A1* | 11/2005 | Vannithamby et al. | 455/522 |
| 2005/0288030 A1* | 12/2005 | Choi et al. | 455/450 |
| 2006/0116171 A1 | 6/2006 | Tiedemann, Jr. et al. | |
| 2006/0121946 A1* | 6/2006 | Walton et al. | 455/561 |
| 2006/0133323 A1 | 6/2006 | Obuchi et al. | |
| 2006/0135169 A1 | 6/2006 | Sampath et al. | |
| 2006/0233131 A1 | 10/2006 | Gore et al. | |

FOREIGN PATENT DOCUMENTS

| | | |
|---|---|---|
| JP | 2005509360 | 4/2005 |
| JP | 2005530461 A | 10/2005 |
| JP | 2006174286 A | 6/2006 |
| JP | 2006253924 A | 9/2006 |
| JP | 2007535867 A | 12/2007 |
| JP | 2008536387 | 9/2008 |
| JP | 2008526125 A | 1/2011 |
| RU | 2026611 C1 | 1/1995 |
| RU | 2181229 C1 | 4/2002 |
| RU | 2264036 | 11/2005 |
| WO | WO0176098 A2 | 10/2001 |
| WO | WO03041300 | 5/2003 |
| WO | WO03067783 | 8/2003 |
| WO | WO03098861 | 11/2003 |
| WO | WO2004066104 | 8/2004 |
| WO | 2004077685 A2 | 9/2004 |
| WO | WO2004098072 A2 | 11/2004 |
| WO | 2005043829 A2 | 5/2005 |
| WO | 2005060132 A1 | 6/2005 |
| WO | WO2005112299 A1 | 11/2005 |
| WO | 2006020032 | 2/2006 |
| WO | WO2006069302 | 6/2006 |
| WO | WO2006107835 A1 | 10/2006 |
| WO | WO2007059914 | 5/2007 |

OTHER PUBLICATIONS

Written Opinion—PCT/US2007/082302, International Search Authority—European Patent Office—Apr. 3, 2008.
Taiwan Search Report—TW096139930—TIPO—Jun. 19, 2012.
Taiwan Search Report—TW096139930—TIPO—Mar. 30, 2013.
Supplementary European Search Report—EP07854364—Search Authority—Hague—Jul. 22, 2013.
European Search Report—EP14185894—Search Authority—The Hague—Feb. 17, 2015.

* cited by examiner

| FIELD | LENGTH (bits) |
|---|---|
| MessageID | 8 |
| CellNullCQIIncluded | 1 |
| CellNullCQI | 0 or 4 |
| ReportType | 1 |
| NumPilots | 6 |

NumPilots Occurrences of the following record{

| FIELD | LENGTH (bits) |
|---|---|
| PilotID | 10 |
| ChannelBandSameAsPrevious | 1 |
| ChannelBand | Variable |
| NumResourceSets | 5 |

NumResourceSets instances of the following record?

| FIELD | LENGTH (bits) |
|---|---|
| ResourceSetID | 5 |
| NumRanksOrLayers | 4 |

NumRanksOrLayers occurrences of the following record{

| FIELD | LENGTH (bits) |
|---|---|
| VCQI | 4 |

}}}

| Reserved | 0-7 |
|---|---|

FIG. 5

ENABLING RESOURCE PARTITIONING FOR WIRELESS COMMUNICATION SYSTEMS

CROSS-REFERENCE

This application claims the benefit of U.S. Provisional Application Ser. No. 60/862,642, filed Oct. 24, 2006, entitled "SYSTEM AND METHOD FOR RESOURCE PARTITIONING WIRELESS COMMUNICATION SYSTEMS" and U.S. Provisional Application Ser. No. 60/863,121, filed Oct. 26, 2006, entitled "SYSTEM AND METHOD FOR RESOURCE PARTITIONING WIRELESS COMMUNICATION SYSTEMS".

The entirety of these applications are incorporated herein by reference.

BACKGROUND

I. Field

The following description relates generally to wireless communication, and amongst other things, to enabling resource partitioning for wireless communication systems.

II. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices, such as cellular telephones, has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can comprise a portion of sequential time slices or time slots. Each user may be provided with one or more time slot and subcarrier combinations for transmitting and receiving information in a defined burst period or frame. The hopping schemes may generally be a symbol rate hopping scheme or a block-hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal.

Typically, a terminal might report its pilot strength to a base station. However, this one measurement (pilot strength) might not allow for dynamic resource allocation and/or for frequency reviews.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with enabling resource partitioning in a wireless communication environment.

In accordance with an aspect is a method for enabling resource partitioning in a wireless communication system. The method includes receiving a vectorized channel quality indicator (VCQI) report from at least one terminal within the wireless communication system. The method also includes determining which resource to allocate based on the VCQI report.

Another aspect relates to a wireless communications apparatus. The apparatus includes a processor and a memory. The memory stores information generated by the processor. The processor executes instructions for accepting profile information from at least one terminal and determining resources to assign based on the profile information.

A wireless communications apparatus that facilitates resource planning is another aspect. The apparatus includes a means for receiving a VCQI report from at least one terminal within the wireless communication system. The apparatus also includes a means for determining which resource to allocate based on the VCQI profile.

Another aspect relates to a machine-readable medium having stored thereon machine-executable instructions for receiving profile information from at least one terminal, wherein the profile information is included in a VCQI report. The machine-executable instructions are also for assigning resources based on the received profile information.

Still another aspect relates to an apparatus operable in a wireless communication system. The apparatus includes a processor configured to receive a VCQI report from at least one terminal and allocate at least one resource based on the VCQI report. The processor is also configured to determine a power profile based on the VCQI report and adjust a transmit power based on the determined power profile.

A related aspect is a method for transmitting power profile information in a wireless communication environment. The method includes measuring a channel quality and creating a VCQI report that includes the measured channel quality information. The VCQI report is transmitted to at least one base station, which can be a serving base station or a non-serving base station.

A further aspect relates to a wireless communications apparatus that includes a processor and a memory. The processor executes instructions for measuring a channel quality, creating a report that includes the channel quality information and communicating the report to at least one base station. The memory stores information generated by the processor.

Still another aspect relates to a wireless communication apparatus. The apparatus includes a means for evaluating a channel quality and a means for creating a VCQI report that includes the evaluated channel quality information. The apparatus also includes a means for conveying the VCQI report to at least one base station.

Yet another aspect relates to a machine-readable medium having stored thereon machine-executable instructions for evaluating a channel quality and creating a VCQI report that includes the evaluated channel quality information. The VCQI report can be conveyed to at least one base station, wherein the at least one base station is a serving base station or a non-serving base station.

Another related aspect is an apparatus operable in a wireless communication system. The apparatus includes a processor configured to receive a plurality of signals each signal corresponding to at least a portion of at least one tile and evaluate a location of at least one null pilot in the tile. The processor can be further configured to determine interference information based upon the at least one pilot.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIG. 5 illustrates an exemplary VCQI Report for Single-Input-Multiple-Output environments.

DETAILED DESCRIPTION

Figure 1:
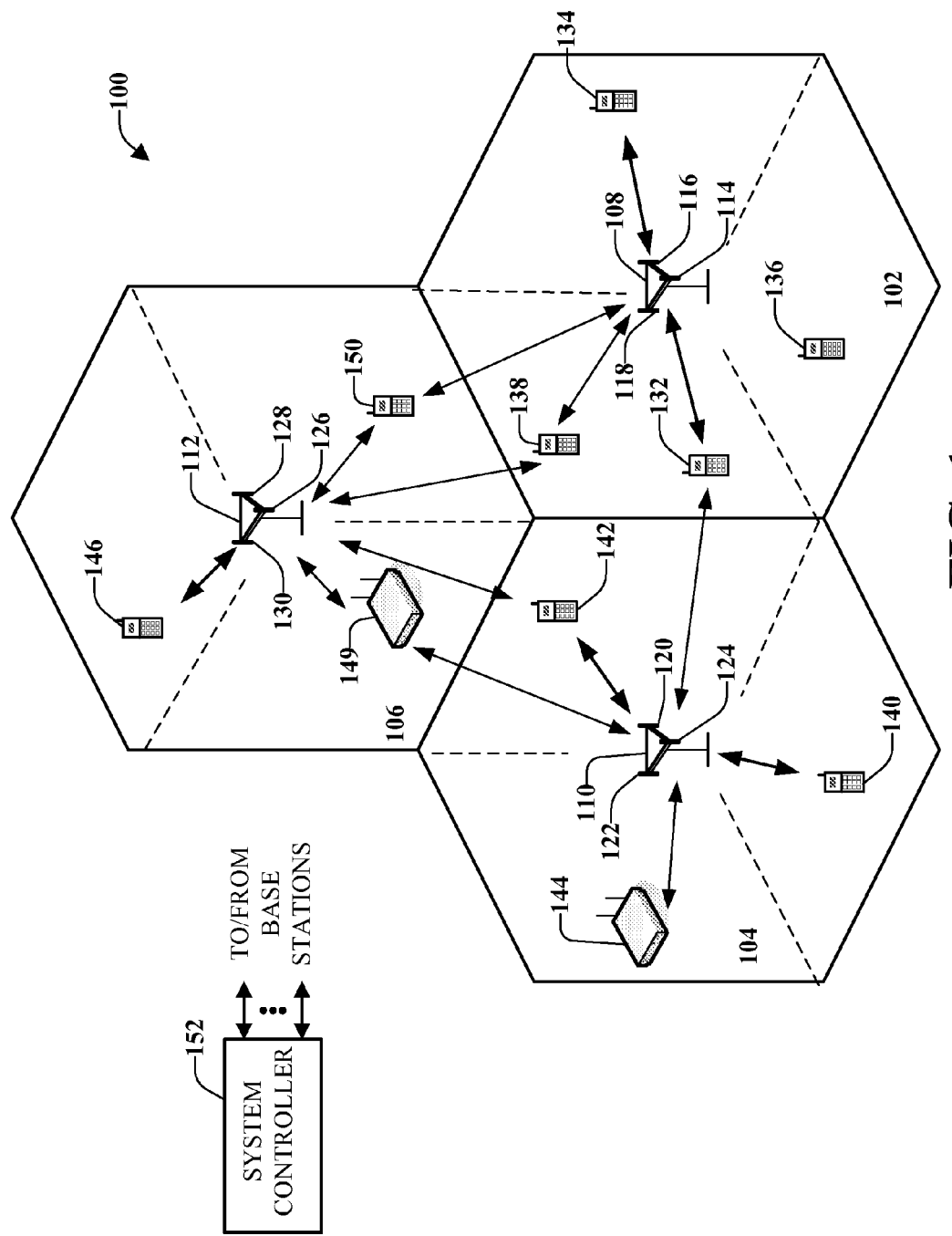
FIG. 1 illustrates a multiple access wireless communication system that can utilize the disclosed aspects.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules and/or may not include all of the devices, components, modules discussed in connection with the figures. A combination of these approaches may also be used.

FIG. 1 illustrates a multiple access wireless communication system 100 that can utilize the disclosed aspects. In further detail, a multiple access wireless communication system 100 includes multiple cells, e.g. cells 102, 104, and 106. In the embodiment of FIG. 1, each cell 102, 104, and 106 may include an access point 108, 110, 112 that includes multiple sectors. The multiple sectors are formed by groups of antennas each responsible for communication with access terminals in a portion of the cell. In cell 102, antenna groups 114, 116, and 118 each correspond to a different sector. In cell 104, antenna groups 120, 122, and 124 each correspond to a different sector. In cell 106, antenna groups 126, 128 and 130 each correspond to a different sector.

Each cell includes several access terminals, which are in communication with one or more sectors of each access point. For example, access terminals 132, 134, 136, and 138 are in communication with base station 108, access terminals 140, 142, and 144 are in communication with access point 110, and access terminals 146, 148, and 150 are in communication with access point 112.

As illustrated in cell 104, for example, each access terminal 140, 142, and 144 is located in a different portion of it respective cell than each other access terminal in the same cell. Further, each access terminal 140, 142, and 144 may be a different distance from the corresponding antenna groups with which it is communicating. Both of these factors provide situations, also due to environmental and other conditions in the cell, to cause different channel conditions to be present between each access terminal and its corresponding antenna group with which it is communicating.

A controller 152 is coupled to each of the cells 102, 104, and 106. Controller 152 may contain one or more connections to multiple networks, such as the Internet, other packet based networks, or circuit switched voice networks that provide information to, and from, the access terminals in communication with the cells of the multiple access wireless communication system 100. Controller 152 includes, or is coupled with a scheduler that schedules transmission from and to access terminals. In some embodiments, scheduler may reside in each individual cell, each sector of a cell, or a combination thereof.

As used herein, an access point can be a fixed station used for communicating with the terminals and can also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors (e.g., having different antenna groups for different sectors), other approaches may be utilized. For example, utilizing multiple fixed "beams" that each cover different areas of the cell in frequency space may be utilized in place of, or in combination with, physical sectors.

Figure 2:
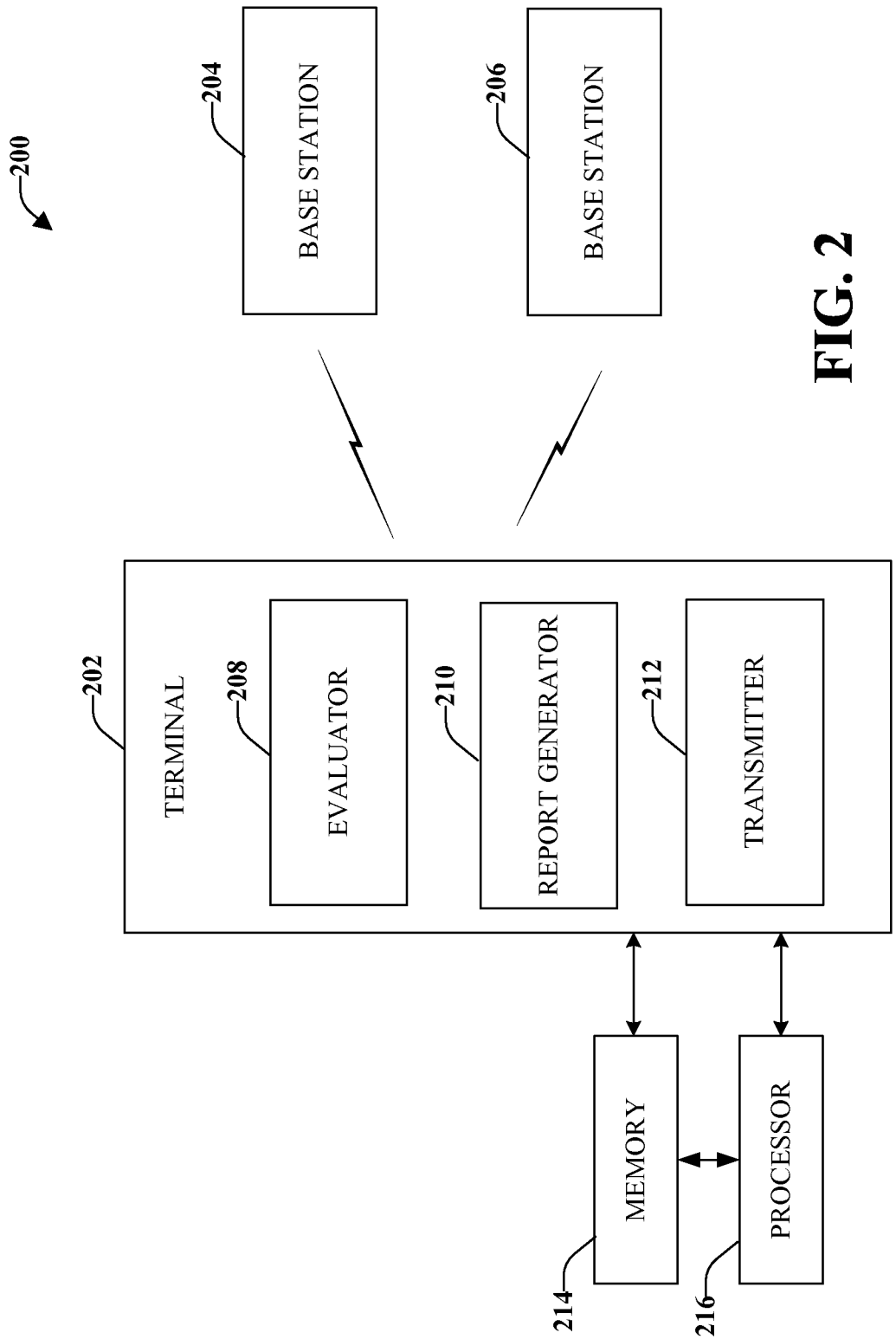
FIG. 2 illustrates an example system that enables resource partitioning in a wireless communication environment.

FIG. 2 illustrates an example system 200 that enables resource partitioning in a wireless communication environment. System 200 can be configured to generate vectorized channel quality indicator (VCQI) reports and provide the report information to serving and/or non-serving base stations. The reports can be used by a serving base station or a non-serving base station (to which a terminal might hand off) to indicate the terminal's channel quality over time, frequency, and/or space dimensions.

System 200 includes a terminal 202 in wireless communication with one or more base stations 204 and 206, which can be serving and/or non-serving base stations. Although more than one terminal and more than two base stations can be included in a wireless communication environment, such devices are not illustrated for purposes of simplicity.

Terminal 202 can include an evaluator 208 that can be configured to measure channel quality within the wireless communication system. Evaluator 208 can determine the channel quality over various dimensions (e.g., time, frequency, space). Further information relating to determining the channel quality will be provided below.

A report generator 210 can also be included in terminal 202. The report generator 210 can be configured to evaluate the channel quality information measured by evaluator 208 and include the information in a VCQI report that can be sent to the one or more serving and/or non-serving base stations 204, 206 by transmitter 212. Exemplary reports for the SISO and MIMO VCQI will be discussed below with reference to FIGS. 3, 4, and 5.

System 200 can include a processor 214 operatively connected to terminal 202 (and/or a memory 216) to execute instructions relating to measuring channel quality, creating one or more reports and transmitting the one or more reports to a serving base station and/or non-serving base stations. Processor 214 can further execute instructions for receiving a multitude of signals, wherein each signal corresponds to at least a portion of at least one tile, ascertaining a location of at least one null pilot in the tile and evaluating interference information based upon the at least on null pilot. Additionally, processor 214 can further execute instructions for evaluating an interlace on which the signal is received and determining whether to ascertain the location based upon the interlace. Processor 214 can also be a processor that controls one or more components of system 200 and/or a processor that both analyzes and generates information received by transmitter 202 and controls one or more components of system 200.

Memory 216 can store information related to the channel quality information and/or the reports generated by processor 214 and other suitable information related to communicating information in a wireless communication network. Memory 216 can further store protocols associated with taking action to control communication between terminal 202 and base stations 204, 206 such that system 200 can employ the stored protocols and/or algorithms to implement the various aspects disclosed herein.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 210 of the disclosed embodiments are intended to comprise, without being limited to, these and other suitable types of memory.

System 200 can, thus, enhance performance during handoff. At substantially the same time as handoff occurs, the new serving base station has the report and is aware of the sectors in which the terminal has good performance (e.g., less interference). Thus, the terminal 202 can be scheduled over the resource set(s) that has good signal strength. Since both the terminal 202 and the serving base station have the information, it can improve the quality of the communication.

Figure 3:
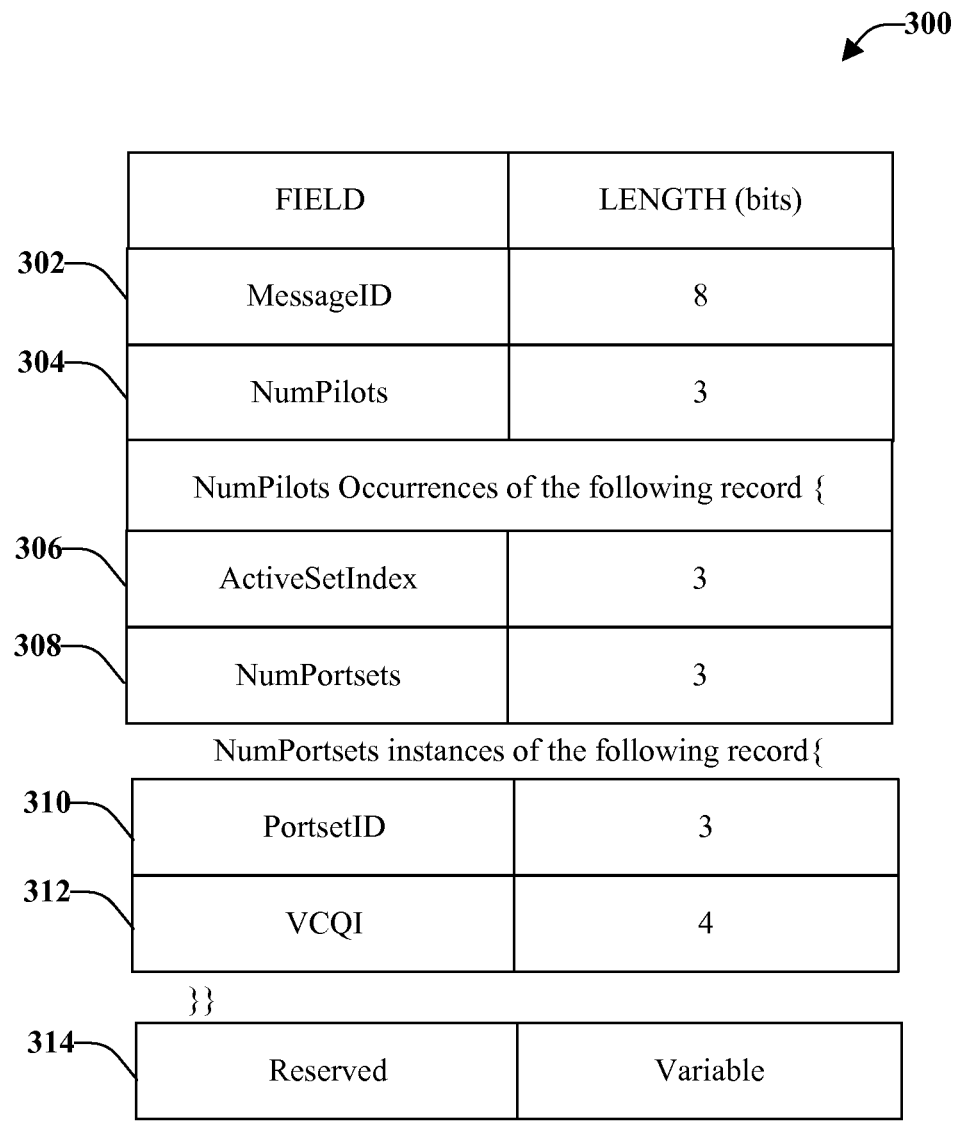
FIG. 3 illustrates fields for an exemplary VCQI Report for Single-Input-Single-Output environments.

FIG. 3 illustrates fields for an exemplary VCQI Report 300 for Single-Input-Single-Output (SISO) environments. It should be understood that the various reports and information contained in the reports described in this specification are exemplary in nature and other fields and/or included information can differ than what is illustrated and described.

A MessageID Field 302 is utilized to identify the VCQIReportSISO message. MessageID 302 can have a length of eight bits. A NumPilots Field 304 can be three bits in length and can be set to the number of sectors for which is report is being sent.

There can be NumPilotsOccurances of an ActiveSetIndex Field 308 and a NumPortsSet Field 310. The ActiveSetIndex 308 can be the ActiveSetIndex corresponding to the sector for which VCQI is being reported and can be three bits in length. The NumPortsSet 310 can be three bits in length and can be the number of port sets in the corresponding sector for which VCQI is being reported.

NumPortsets instances can be the PortsetID Field 312 and the VCQI Field 314. The PortsetID 312 can be three bits in length and can be the index of the port set corresponding to the VCQI field 314. The VCQI field can be four bits in length and can be set to the VCQIValueSISO for this port set. VCQIValueSISO is defined in the CQICH Physical Layer Channel Procedures for the Reverse Control Channel MAC Protocol.

There can also be a Reserved Field 316 that can have a variable length. The Reserved Field 316 is equal to the number of bits needed to make the message length an integer number of octets. The Reserved Field 316 should be set to all zeros.

A port-set or hop-port is a tone in the logical domain. In OFDMA systems, for example, each symbol is modulated to a frequency onto a tone. Hop-port is in the logical domain and facilitates allocation of resources, wherein some resources are allocated to a user. The physical domain is referred to as sub-carriers or tones. These are a set of logical resources. For each of them, a report can be generated for non-port-sets of such instances. The report can indicate the port set ID (ID of logical resource) this is the CQI (channel quality indication) over the resource set. The terminal can send the report to serving and/or non-serving base stations.

Figure 4:
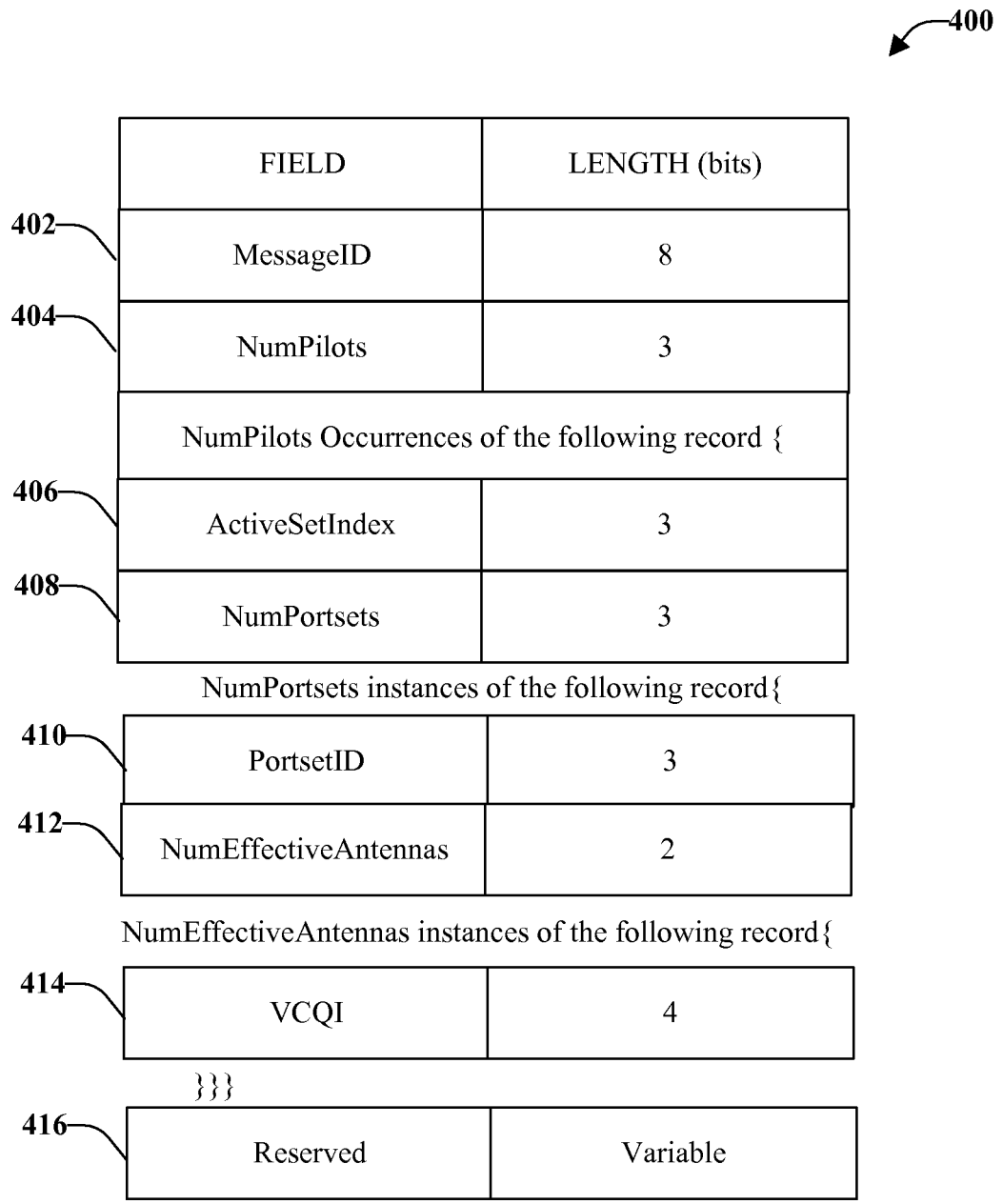
FIG. 4 illustrates exemplary fields for a VCQI Report for Multiple-Input-Multiple-Output environments.

With reference now to FIG. 4, illustrated are exemplary fields for a VCQI Report 400 for Multiple-Input-Multiple-Output (MIMO) environments. In MIMO for each layer, there can be a different CQI. A MessageID Field 402 can be eight bits in length and can be utilized to identify the VCQIReportMIMO message. A NumPilots Field 404 can be three bits in length and can be set to the number of sectors for which the report is being sent.

NumPilots Occurrences of the following record can include an ActiveSetIndex Field 406 and a NumPortsets Field 408. The ActiveSetIndex Field 406 can be three bits long and can be the ActiveSetIndex corresponding to the sector for which VCQI is being reported. The NumPortsets Field 408 can be three bits long and can be the number of port sets in the corresponding sector for which VCQI is being reported.

NumPortsets instances of the following records can include a PortsetID field 410 and a NumEffectiveAntennas Field 412. The PortsetID 410 can be three bits long and can be the index of port set corresponding to a VCQI Field 414. The NumEffectiveAntennas Field 412 can be two bits in length and can be the number of effective antennas corresponding to a VCQI Field 414.

NumEffectiveAntennas of the following record can include the VCQI Field 414, which can be four bits in length. The VCQI Field 414 can be set to the VCQIValueMIMO for this port set. VCQIValueMIMO is defined in the CQICH Physical Layer Channel Procedures for the Reverse Control Channel MAC Protocol.

Also included is a Reserved Field 416 that can have a variable length. The Reserved Field 416 can be equal to the number needed to make the message length an integer number of octets. This field should be set to all zeros.

FIG. 5 illustrates another exemplary VCQI Report 500 for Single-Input-Multiple-Output (SIMO) environments. In accordance with some aspects, a basic active set management protocol can include various fields that can be created by an access terminal. This report can indicate whether Cell NullCQI is include or not included. Thus, instead of measuring interference over the general pilot, interference is now measured over the particular cell null channel where the serving cell is not transmitting anything. This can coordinate different sectors in the cell and part of the interference can be measured from inside or outside of the cell.

The VCQI report 500 can include a MessageId Field 502 that can have a length of eight bits. An access terminal can set the MessageID Field 502 to 0X01. A CellNullCQIIncluded Field 504 can have a length of one bit. If a CellNullCQI value is not included, the access terminal can set this field to "0". Otherwise, the access terminal sets this field to "1".

Another field is the CellNullCQI 506, which can have a length of zero bits or four bits. If the CellNullCQIIncluded is "1", the access terminal includes this bits and sets the field to the CellNullCQI defined for the forward link serving sector in the Reverse Control Channel MAC. Otherwise, the CellNullCQIIncluded Field is omitted.

A ReportType Field 508 can be one bit in length and a NumPilots Field 510 can be six bits long. The ReportType Field 508 can be set to "0" for a Single-Code Word (SCW) report and "1 for a Multi-Code Word (MCW) report. The NumPilots Field 510 can be six bits in length. The access terminal can set this field to the number of sectors for which the report is being sent. Additionally, the access terminal can include all members of the Combined Active Set in this message. NumPilots Occurrences include a PilotID Field 512, a ChannelBandSameAsPrevious Field 514, a ChannelBand Field 516, and/or a NumResourceSets Field 518.

The PilotID Field 512 can be ten bits in length. The access terminal can set the PilotID Field 512 to a PilotID of a pilot in the Active Set. The ChannelBandSameAsPrevious Field 514 can be one bit in length. The access terminal can set this field to "1" if there is only one ChannelBand in the Combined Active Set, or if this ChannelBand is the same as the ChannelBand for the previous pilot listed in this message. Otherwise, the access terminal can set this field to "0".

The ChannelBand Field 516 can have a variable length. The ChannelBand field can be included if ChannelbandSameAsPrevious is equal to "0", otherwise it should be omitted. If included, this field can be set to the ChanneLBand record for this pilot.

The NumResourceSets Field 518 can be five bits in length. The access terminal can set this field to the number of resource sets being reported. The NumResourceSets instances can include a ResourceSetID Field 520 that is five bits in length and a NumRanksOrLayers Field 522 that is four bits in length. The ResourceSetID Field 520 can be set to the ResourceSetID corresponding to the following record. The NumRanksOrLayers Field 522 references the number of ranks or layers reported in the message.

A VCQI Field 524 can be four bits in length. If ReportType is "0", the VCQI field can be set to the VCQIValueSCW for this ResourceSet and Rank. If ReportType is "1", this field shall be set to the VCQIValueMCW for this ResourceSet and Layer. VCQIValueSCW and VCQIValueMCW can be defined in the Reverse Control Channel MAC Protocol.

Also included can be a Reserved Field 526, which can be zero through seven bits in length. The number of bits in this field is equal to the number needed to make the message length an integer number of octets. This field can be set to all zeros.

Figure 6:
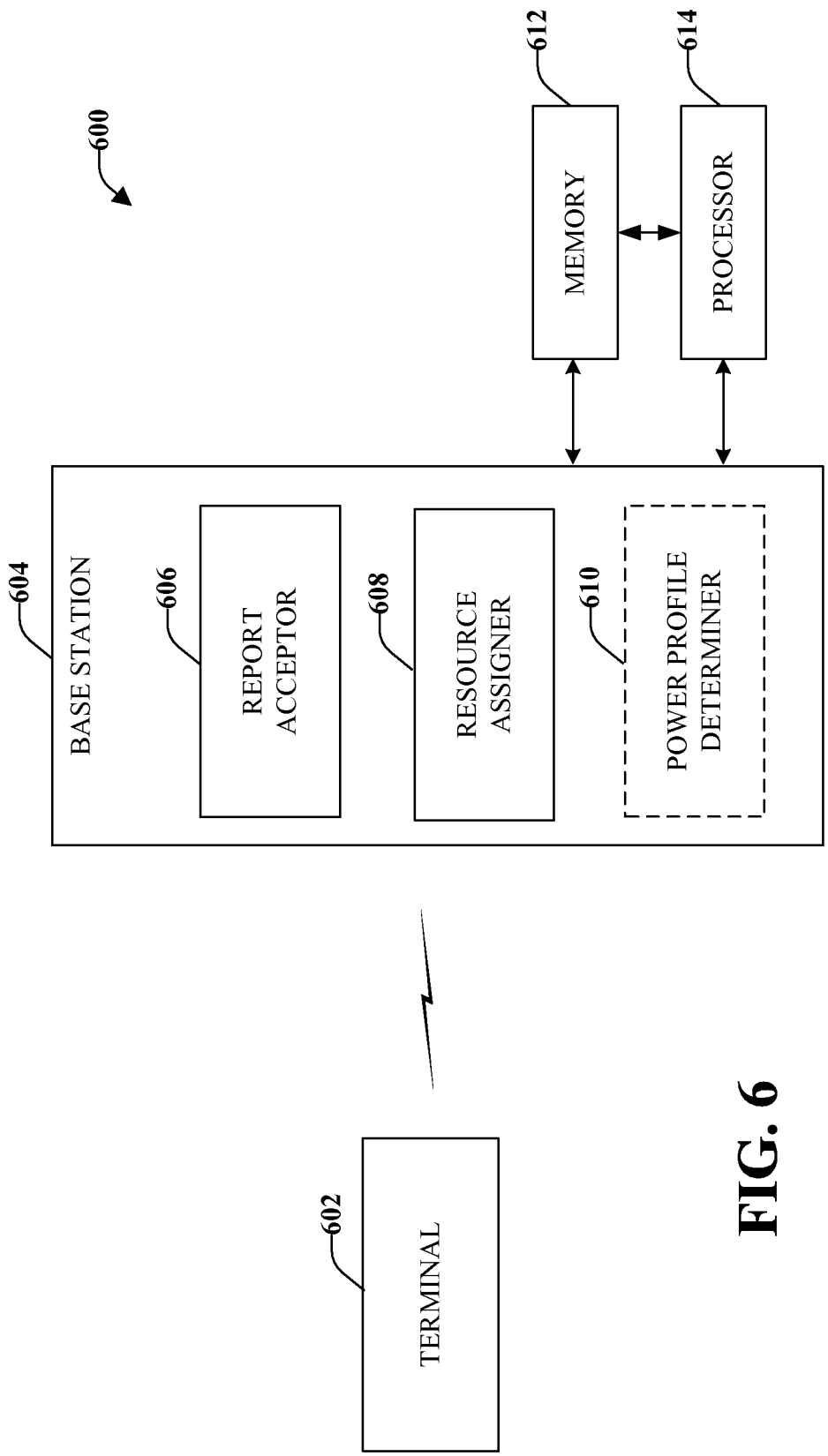
FIG. 6 illustrates a system for enabling resource partitioning.

With reference now to FIG. 6, illustrated is a system 600 for enabling resource partitioning. System 600 can facilitate scheduling based on a report provided by mobile terminals within the wireless communication environment. This scheduling can be utilized for a handoff situation because frequency planning and the full information over which resource set or port-set is available. If there is adequate channel quality, system can extend coverage and facilitate a dynamic adjustment. Such dynamic scheduling can allow a mobile terminal to maintain consistent communications with minimal interruptions of the communication.

In further detail, system 600 includes one or more terminals 602 in wireless communication with one or more base stations 604, however only one of each is illustrated for purposes of simplicity. The base station 604 can be a serving base station or a non-serving base station (e.g., a base station to which the terminal 602 might handoff.

Typically, a terminal might report its pilot strength to a base station. However, this one measurement (pilot strength) might not allow for dynamic resource allocation and/or for frequency reviews. Frequency review can be utilized when there are multiple sectors that might be causing interference to each other. Due to fluctuations in signal strength, there might be a time when it would be more beneficial for the terminal to handoff to another sector (e.g., base station). If frequency planning is not performed, the terminal's communication can be disrupted (e.g., signal level decays to the point where the connection is lost). To mitigate this problem, some resources are allocated, such as through frequency reuse so that the sectors are not interfering with each other.

Thus, base station 604 can include a report acceptor 606 that can be configured to receive a VCQI report or profile from one or more terminals 602. The report acceptor 606 can associate the report with the particular terminal 602 that transmitted the report.

Based on the information included in the VCQI report or other profile information, a resource assigner 608 can determine which set of resources should be assigned to the terminal 602. For example, for a current serving sector, the terminal might report that the SNR is high and on other resource sets that the SNR is low. This might indicate that neighboring sectors are interfering on one of the resource sets. Resource assigner 608 can analyze this information and schedule the terminal on the resources that are not interfering. The resource that are interfering can be scheduled to another terminal that is not experiencing interference.

Thus, the report allows resource assigner 608 to determine and assign a more optimal resource to a certain user and/or can utilize the information for handoff extension. Thus, instead of performing a handoff in 15 milliseconds, for example, after which the terminal's signal goes to 10 dB, there might be some resources that the terminal can handoff to much slower because the terminal is not experiencing interference. Thus, the terminal can handoff at a higher SNR. Thus, when interference management is in place, the VCQI report or message can enable efficient handoff or scheduling.

Additionally or alternatively, the report can be utilized by a power profile determiner 610 to dynamically ascertain the amount of interference in the system 600. For example, a random frequency can be chosen and transmitted. A report can be received by one or more terminals 602 indicating that given the amount of transmission, the terminals might report that there is some interference and the base station 604 is transmitting over too many resources. In this situation, the base station 604 can reduce its transmission based on the reports. The reports can also be utilized to drive frequency planning and to dynamically decide what frequency plan should be used for a more optimal setting.

Thus, system 600 can facilitate frequency planning and can allocate resources based on a system-wide impact point of view. The report can be utilized for the individual terminals and how such terminals should be scheduled. In accordance with some aspects, the report can be utilized to determine how much interference a base station is causing. If the base station is causing an excessive amount of interference it can lower its transmitting power, which can also facilitate better handoff. These two pieces of information can be utilized to determine how a base station should adjust its resource allocation.

System 600 can include a processor 612 operatively connected to base station 604 (and/or a memory 614) to execute instructions relating to accepting profile information for at least one terminal, which might be a terminal being served by a base station or a terminal not being served by the base station. Processor 612 can also execute instructions for determining resources to assign based on the profile information.

Additionally, processor 612 can execute instructions for determining a power profile of the base station based on the received profile information. Further, processor 612 can execute instructions for adjusting a transmit power of the base station based on the determined power profile.

Processor 612 can also be a processor that controls one or more components of system 600 and/or a processor that both analyzes and generates information received by base station 604 and controls one or more components of system 600.

Memory 614 can store information generated by processor 612 and other suitable information related to communicating information in a wireless communication network. Memory 614 can further store protocols associated with taking action to control communication between terminal 602 and base stations 604 such that system 600 can employ the stored protocols and/or algorithms to implement the various aspects disclosed herein.

Figure 7:
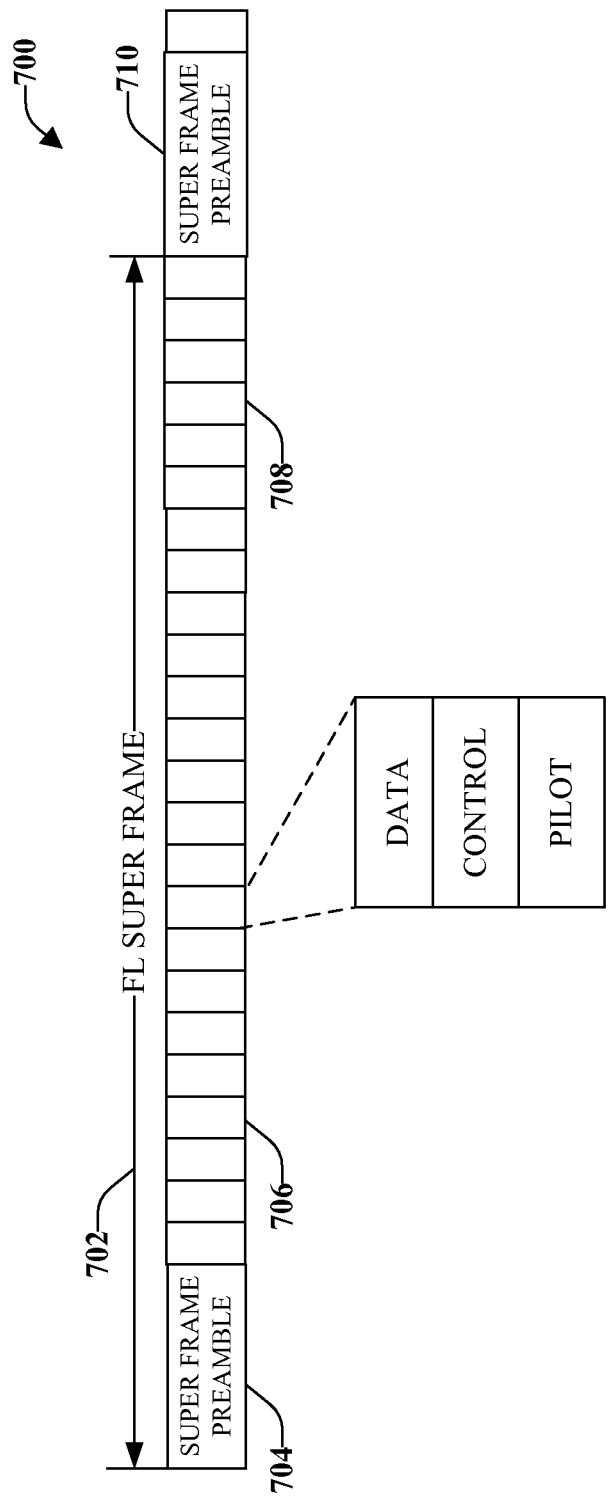
FIG. 7 illustrates aspects of superframe structures for a frequency division duplexed (FDD) multiple access wireless communication system.
Figure 8:
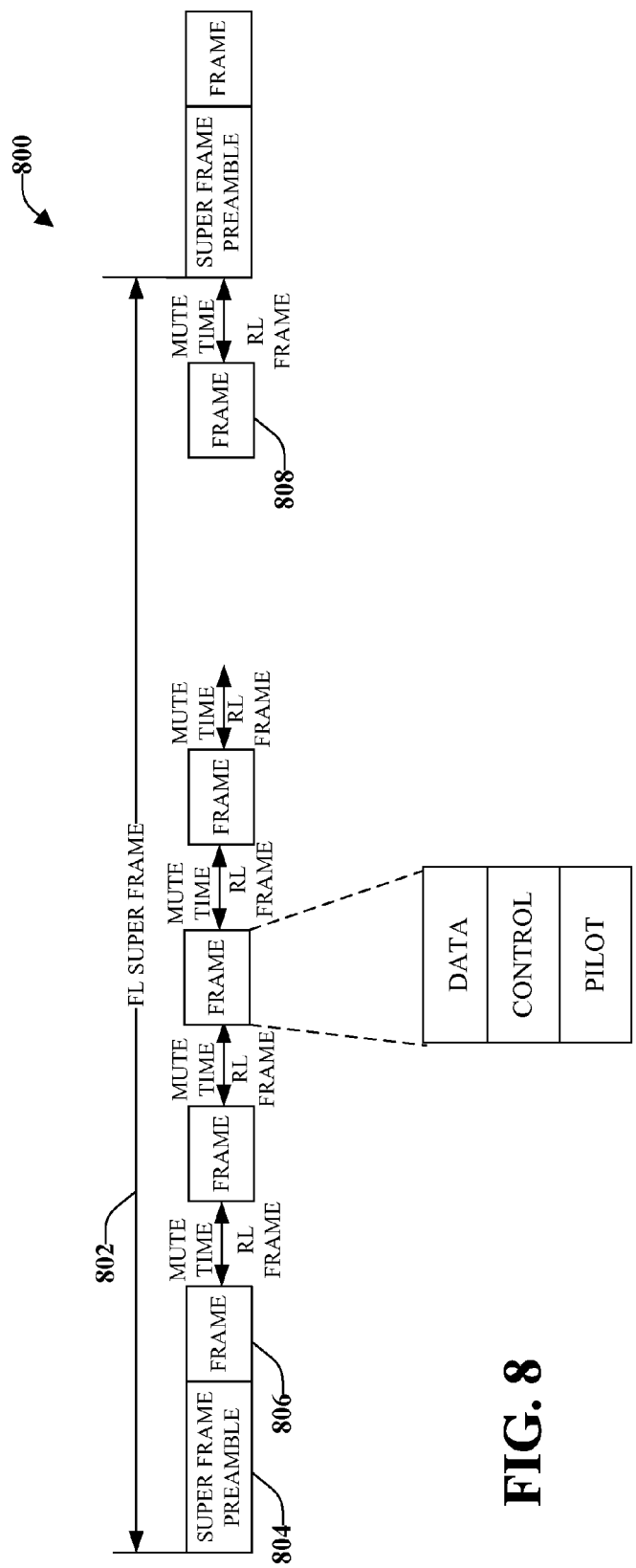
FIG. 8 illustrates aspects of superframe structures for a time division duplexed (TDD) multiple access wireless communication system.

In order to fully appreciate the disclosed aspects, superframe structures for multiple access wireless communication systems will be discussed. FIG. 7 illustrates aspects of superframe structures 700 for a frequency division duplexed (FDD) multiple access wireless communication system. FIG. 8 illustrates aspects of superframe structures 800 for a time division duplexed (TDD) multiple access wireless communication system.

The forward link transmission is divided into units of superframes 700, 800 that can include superframe preamble 704, 804 followed by a series of physical layer frames, a few of which are labeled at 706, 708, 806, 808. In an FDD system, the reverse link and the forward link transmission can occupy different frequency bandwidths so that transmissions on the links do not, or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It should be noted that the number of N and M may be vary within a given superframe or between superframes.

In both FDD and TDD systems, each superframe can comprise a superframe preamble. In certain embodiments, the superframe preamble includes a pilot channel that includes pilots that may be used for channel estimation by access terminals and acquisition information such as timing and other information sufficient for an access terminal to communicate. The superframe preamble can further include a broadcast channel that includes configuration information that the access terminal may utilize to demodulate the information contained in the forward link frame on one of the carriers and basic power control or offset information. In other cases, only some of the above and/or other information may be included in this superframe preamble.

As shown in FIGS. 7 and 8, the superframe preamble is followed by a sequence of frames. Each frame can include the same or a different number of OFDM symbols, which can include a number of subcarriers that may be simultaneously utilized for transmission over some defined period.

Further, each frame can be partitioned to have one or more zones operating according to a symbol rate mode, where one or more non-contiguous OFDM symbols, subcarriers, or combinations thereof, are assigned to a user on a forward link or reverse link, and one or more zones operating according to a block mode, where users are assigned contiguous OFDM symbols, subcarriers, or combinations thereof. The subcarriers assigned to symbol rate users need not be contiguous throughout the frame and can be interspersed between block users.

In certain aspects, a total bandwidth may be divided into a number carriers that are subsets of the total bandwidth. The carriers may comprise 5 MHz of a 20 MHz bandwidth, with each carrier comprising 512 subcarriers. However, other sizes of bandwidth, subcarriers, and carriers may be utilized. Further, the number of subcarriers allocated to each carrier may vary, so that the number of subcarriers in each carrier can be different from each other carrier or one carrier may have more subcarriers than the other carriers. Also, it should be noted that one or more carriers may be asynchronous with respect to each other (e.g., having different start and end times for their forward link frame and/or reverse link frame). Signaling or assignment messages, in the control channel or superframe preamble can communicate the timing information in such cases for a particular carrier.

In other aspects, a carrier can comprise a bandwidth of 1.25 MHz (e.g., having 128 subcarriers) or 2.5 MHz (e.g., having 256 subcarriers). It should be noted that the number of subcarriers can vary by carrier. Further, the size of bandwidth is subject to the applicable bandwidth allotments, and divisions thereof, of the applicable regulatory agency.

Figure 9:
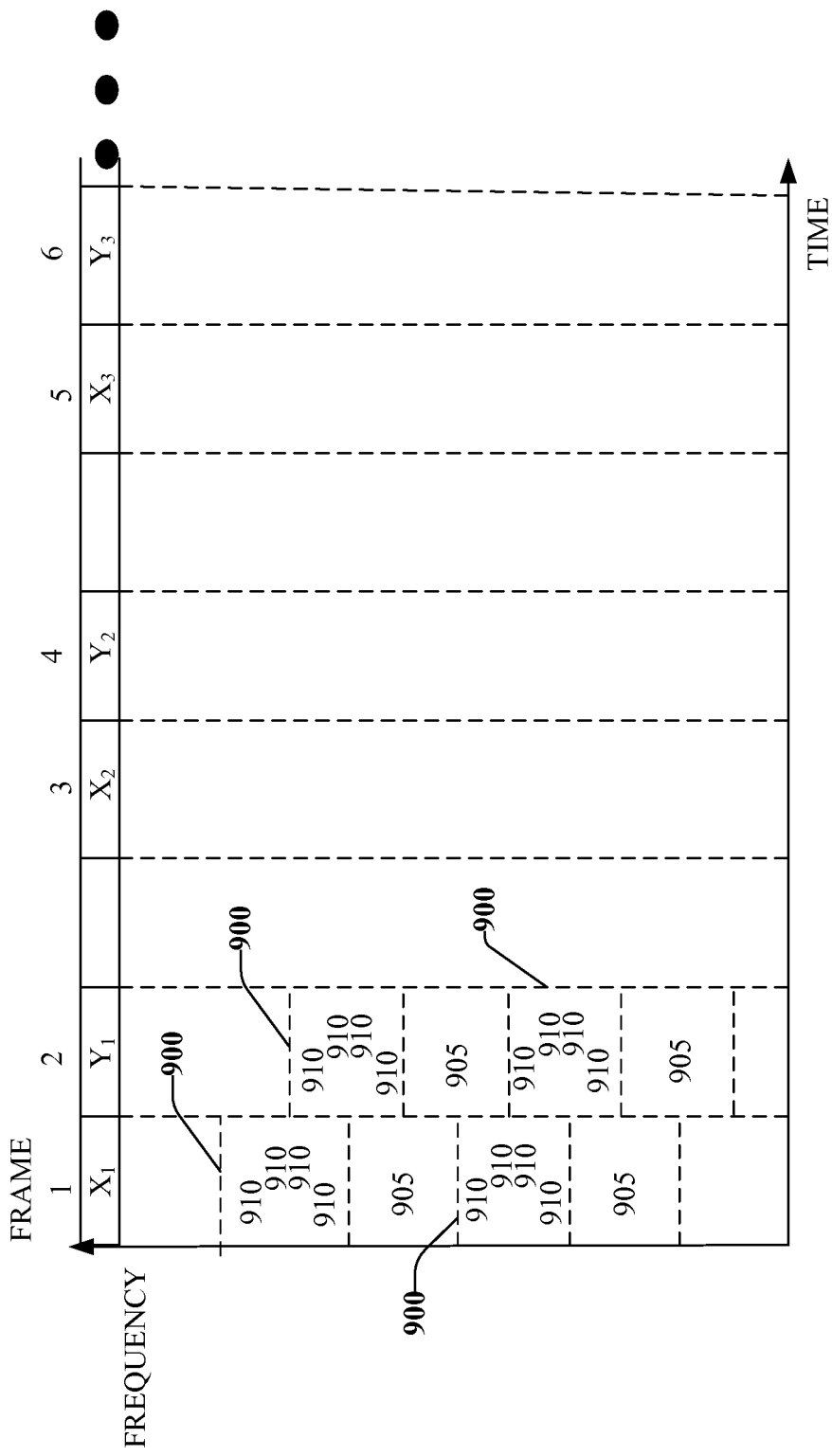
FIG. 9 illustrates aspects of a resource partitioning scheme for a multiple access wireless communication system.

Referring to FIG. 9, aspects of a resource partitioning scheme for a multiple access wireless communication system are illustrated. In FIG. 9, the wireless communication system is partitioned into interlaces. There can be an interlace consisting of frames Xi, X2, and X3 and an interlace consisting of frames $Y_1$, Y2 and Y3. The number of interlaces and the frames per interlace can vary with system deployments. Further, the number of frames per interlace and be different for different interlaces, and can vary over time due to scheduler or system based changes.

Each frame comprises block mode zones 900 and distributed mode zones 905. The block mode zones 900 comprise users that have contiguous assignments of OFDM symbols, subcarriers, or combinations thereof. The distributed zones 900 comprise users that have non-contiguous assignments of OFDM symbols, subcarriers, or combinations thereof.

As discussed above, assignments in distributed zone 905 may comprise distributed symbol-subcarrier combinations in the zone, while assignments in block zone 900 comprises contiguous symbol-subcarrier combinations in the zone. In some aspects, the zones 900 and 905 may comprise a subband (e.g., a predetermined number of subcarriers). Further, the number of subcarriers per zone 900 and 905 can vary on a frame by frame basis. Also, the location of the zones can vary by frame.

In alternate aspects, the location of zones 900 and 905 may be planned across a network. For example, sectors and/or cells that are adjacent to each other can have fixed bandwidth locations for zones 900 and 905, so that symbol rate mode users only interfere with other symbol rate mode users and not with block mode users.

In another aspect, on interlace X, the first L (physical) groups of subcarriers 910 (e.g., groups of 16 subcarriers are grouped together) to form a block zone 900 while groups generally of the same size, not shown, are used to form distributed zones. In one aspect, the grouping of the groups of subcarriers 910 that form a zone may be based upon a bit-reversal order of their spectral location of the groups of subcarriers 910. That is, each group of subcarriers 910 may be assigned a number that is expressed in bits (e.g., if there are 8 zones then each zone may have a 3-bit index). Therefore, by reversing the bit order of the index, frequency diversity can be provided to users of block mode. The frequency diversity can be further enhanced by frequency hopping the assignments for the users in block mode, between different zones 900 on a frame by frame, interlace by interlace or some other basis. In another aspect, the groups 910 for each zone may be distributed across the band (e.g., uniformly spaced).

Further, in some aspects, the zones 900 and 905, an constitute subbands, which can be groups of contiguous subcarriers that have their resources assigned to one of the block or distributed mode. In other aspects, multiple groups of subcarriers 910 may comprise a subband (e.g., a subband may consist of N groups 910). In an aspect, a user can be scheduled to communicate on a particular subband, based upon channel conditions or selected preferences. In further aspects, where channel trees are utilized, each subband might have its own channel tree for scheduling, allowing one or more users to hop on that tree for the subband, independently of users operating on other subbands.

On the other interlace Y (e.g., the interlace after X) the block zone 900 may be cyclically shifted by subbands or blocks, relative to interlace X. The cyclic shift can vary for each frame of the interlace, be constant for each frame of the interlace, or can comprise a single cyclic shift for all of the frames of the interlace. If there are more interlaces, then there may be a cyclic shift.

It should be noted that the zones 900 and 905 may be synchronized across sectors. This may be provided to facilitate interference estimation and fractional frequency re-use (FFR) operation.

In an aspect, on each interlace, each zone 900 or 905 can be further partitioned into one or more subzones that constitute multiple groups 910. In a subzone utilized in a block mode zone, each subzone includes contiguous groups 910 in that zone. This can be enumerated in the natural order of the spectral location of the groups 910 in the zone. In some aspects, a subzone can constitute a subband and each zone can constitute multiple subbands.

In a further aspect, a subzone of a distributed zone 905 includes consecutive groups in that zone, enumerated in bit-reversal order of their spectral location or in natural order of spectral location. In another aspect, the groups 910 for each subzone may be distributed across the band (e.g., uniformly spaced).

In an aspect, a distributed channel may consist of 16 tones per OFDM symbol. In a further aspect, each channel may hop within a distributed subzone, at symbol-rate, every OFDM symbol, or some other way.

In an aspect, a block channel may include a 16 tone by 8 OFDM symbol tile. In a further aspect, each channel may hop within a block subzone at slot rate (e.g., varies per slot) which can comprise some or all of the OFDM symbols of frame.

In some aspects, the hopping of channels within a subzone is independent across sectors. Further, where a channel tree is utilized each block and distributed subzone may be represented by a subtree (e.g., a group of consecutive base nodes and their parent nodes) of a channel tree may be assigned to a subzone. Mapping from channel nodes to channel resources within a subzone may be independent across sectors.

It should be noted that zones can include two-dimensional combinations of OFDM symbols and subcarriers. In such cases, for block mode a zone, or subzone, can include less than all of the OFDM symbols of a frame and some number of subcarriers. In one exemplary aspect, a subzone may include 16 subcarriers by 8 OFDM symbols, and can be equal to one block. In aspects, where a zone or subzone in a frame, a channel tree may be used for resource assignment and in such cases each node can correspond to a two-dimensional combinations of OFDM symbols and subcarriers that can correspond to a zone, subzone, or smaller unit of a two-dimensional combination.

In an aspect, as discussed above, the use of zones may be used to support FFR. In these aspects, resources are partitioned into FFR port-sets within each distributed or block zone. In such aspects, each FFR port-set may be logically referred, and thus scheduled or used for scheduling, as a collection of (subzone, interlace) pairs. In some aspects, a subzone of a block zone may consist of consecutive tiles (e.g., contiguous or non-contiguous resources) in that zone, enumerated in the natural order of their spectral location. In other aspects, a subzone of a distributed zone includes consecutive tiles (e.g., contiguous or non-contiguous resources) in that zone, enumerated in bit-reversal order of their spectral location or natural order of spectral location. This can be a sector parameter or can be indicated through assignment messages.

It should be noted that 1 null pilot is inserted in every tile (e.g., assignable resource or logical resource) to facilitate long-term interference measurements by the access terminal that may be feedback to the access point. The location of the null pilots may be sector and/or cell specific (e.g., 1 in an even tile in one sector and 1 in odd tile for an adjacent sector).

Figure 10:
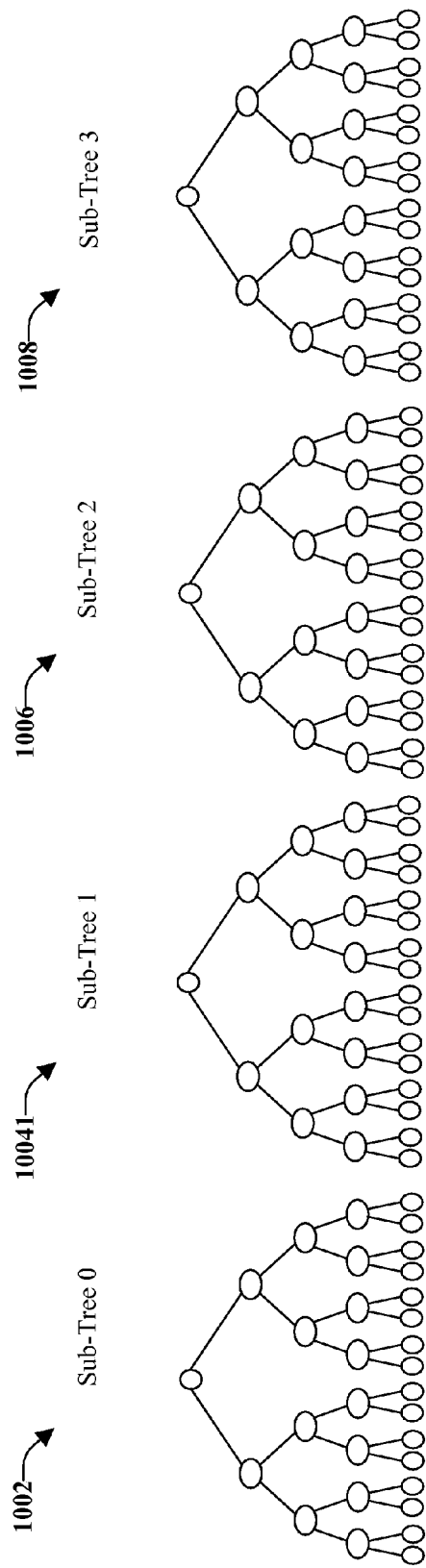
FIG. 10 illustrates aspects of subtrees for a resource partitioning scheme for a multiple access wireless communication system.

FIG. 10 illustrates aspects of subtrees for a resource portioning scheme for a multiple access wireless communication system. A multitude of subtrees, here subtrees 0-4, labeled 1002, 1004, 1006 and 1008, are utilized for a plurality of subzones (e.g., interlaces) at each sector. This may be that each subtree is used for a different subzone. Thus, when hopping or other frequency selective scheduling is enabled, all channels hop within a subzone.

In a further, aspect each node or tier may have an associated power profile. For example, there may be lower PSD port-sets that generally create less interference to neighboring sectors and high PSD port-sets that improve C/I for the target access terminal. In an aspect, in a system with 4 port-sets, a partition of 5 MHz may be into 4 subzones, with 32 (subzone, interlace) pairs for 8 interlaces. However, this division can vary. An exemplary, partition may include, 1 sector specific subzone for low power transmission to high C/I users, 1 common subzone cross sectors of different color for medium power transmission, and 2 sector specific subzones for high power transmission to edge users. In an aspect, interference reduction for cell edge terminals may be provided using a same PBP for sectors having a same frequency reuse and staggering PBP of high/low power subzones for sector of different frequency reuse plans. In another aspect, cyclic shifting of subzones in different interlaces may be performed. This can be used to improve both subband scheduling and FFR operation.

In an aspect, one or more schemes may be used to provide reuse set specific channel quality information (CQI) based on no-reuse CQI and additional information from the access terminals for processing by the access point. In an aspect, a differential (VCQI) message containing the average C/I, or similar information, for each reuse set is reported at much lower frequency for the "long-term" interference offset. In an aspect, the VCQI measurement and reporting periods could be assigned in the handoff set message or other overhead parameter transmitted in a superframe or frame control channel. The VCQI for all sectors in the active set could be provided via a backhaul interface to the destination access point or sector so that a user could be scheduled over favorable reuse set upon handoff.

In an aspect, an access terminal is allowed to send a VCQI report every VCQIReportInterval superframes, where VCQIReportInterval is a part of the overhead parameters. In the case, where the VCQIReportInterval is set to zero, the access terminal does not send any VCQI reports.

In an aspect, when different reporting intervals are assigned by sectors, an access terminal may report according to a minimum reporting interval it receives from the sectors (e.g., in the active set) or taking the serving sector reporting interval (since load is generated at the serving sector). The type of CQI reported may be defined by the overhead parameter or other message (e.g., a single-input single-output (SISO), a single channel value, or multi-input multi-output (MIMO)) values for each channel.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 11:
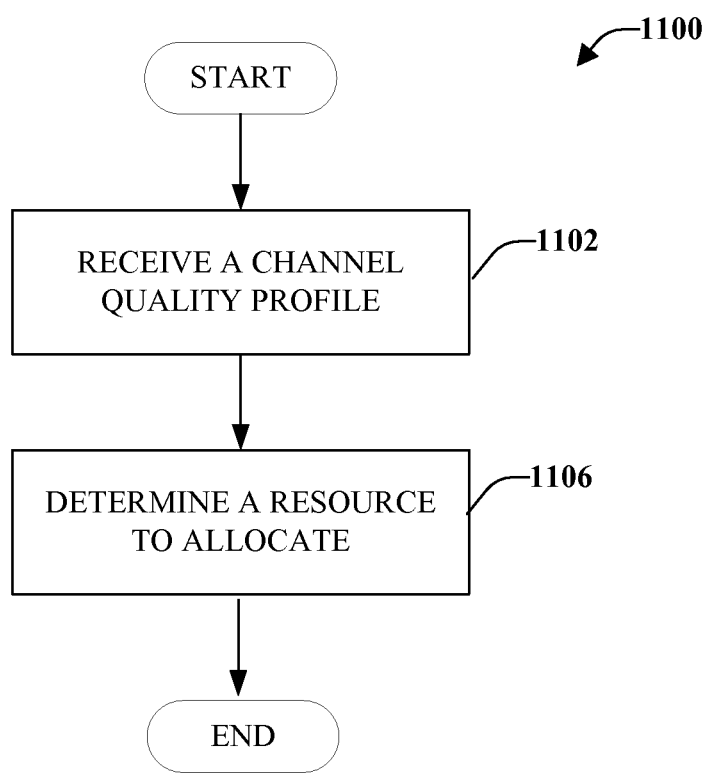
FIG. 11 illustrates a method for enabling resource partitioning in a wireless communication system.

With reference now to FIG. 11 illustrated is a method 1100 for enabling resource partitioning in a wireless communication system. Method 1100 starts, at 1102, when a VCQI report is received from at least one terminal within the wireless communication system. The report can indicate a channel quality profile. The terminal can be a terminal being served by a base station that receives the report or a base station that is not a serving base station. At 1104, the resources to allocate are assigned to the terminal based on the VCQI report. The VCQI report can be a SISO report, a MIMO report or a SIMO report.

Additionally or alternatively, a power profile of a base station can be determined based on the VCQI report received. A transmit power can be adjusted based in part on the determined power profile to provide system-wide benefits.

In accordance with some aspects, method can utilize the VCQI report to determine the profile of each terminal C/I over different logical resources. The terminal can be assigned to at least one logical sub-resource of a multitude of logical sub-resources for a given logical resource, based upon the VCQI report. Each sub-logical resource can be a sub-tree of a channel tree. In some aspects, each sub-logical resource can correspond to a zone corresponding to a portion of bandwidth. Each portion can be assigned based upon a cyclic shift.

Figure 12:
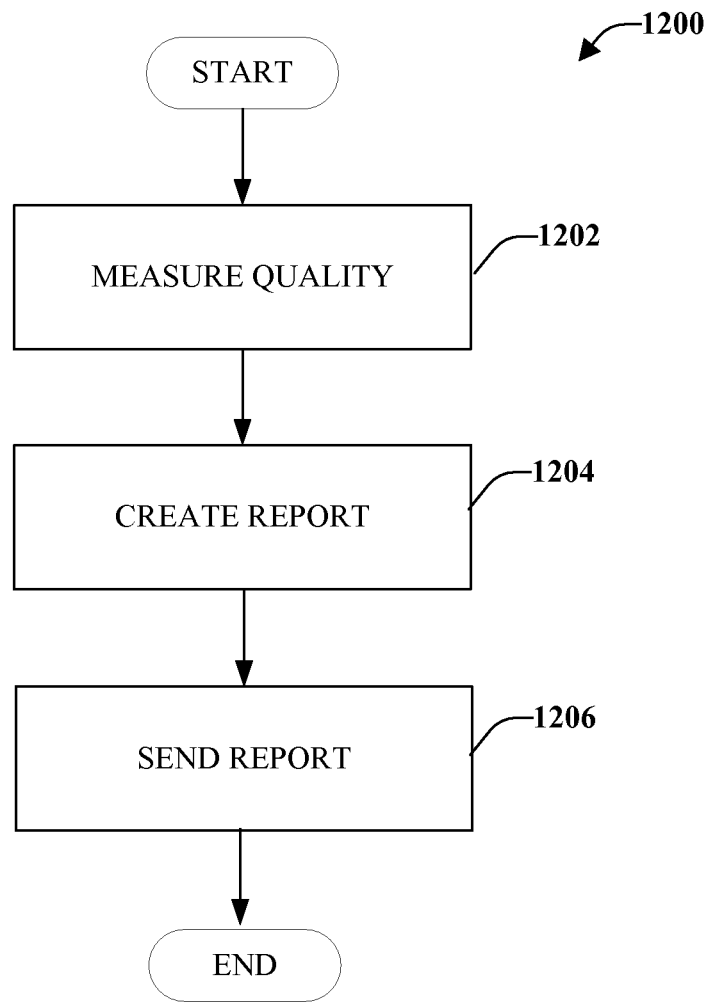
FIG. 12 illustrates a method for transmitting power profile information in a wireless communication environment.

FIG. 12 illustrates a method 1200 for transmitting power profile information in a wireless communication environment. Method 1200 starts, at 1202, when channel quality is measured. The channel quality information is included in a VCQI report that is created, at 1204. The report can be sent to one or more base stations, at 1206. The base stations can be serving base stations or non-serving base stations.

In accordance with some aspects, the VCQI report can include a plurality of signals, wherein each signal corresponding to at least a portion of at least one tile. A location of at least one null pilot in the tile can be determined. Further, based on the at least one null pilot, interference information can be evaluated. Additionally, an interlace on which the signal is received can be determined and based on the determination it can be decided whether to ascertain the location based upon the interlace.

Figure 13:
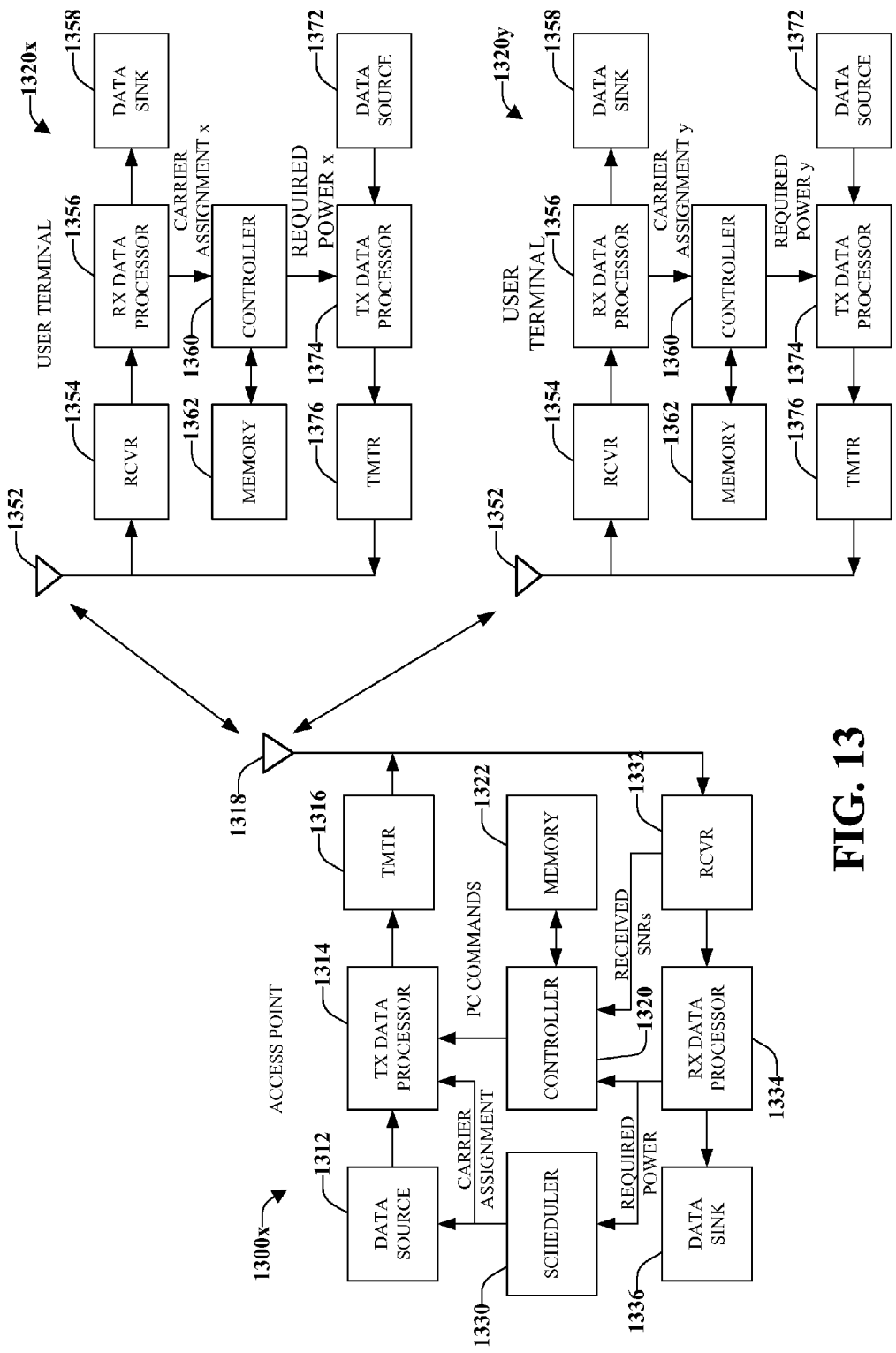
FIG. 13 illustrates a block diagram of an embodiment of a transmitter system and a receiver system.

FIG. 13 illustrates a block diagram of an embodiment of an access point 1310x and two user terminals 1320x and 1320y in multiple-access multi-carrier communication system 1300. At access point 1310x, a transmit (TX) data processor 1314 receives traffic data (e.g., information bits) from a data source 1312 and signaling and other information from a controller 1320 and a scheduler 1330. For example, controller 1320 can provide power control (PC) commands that are used to adjust the transmit power of the active terminals, and scheduler 1330 can provide assignments of carriers for the terminals. These various types of data may be sent on different transport channels. TX data processor 1314 encodes and modulates the received data using multi-carrier modulation (e.g., OFDM) to provide modulated data (e.g., OFDM symbols). A transmitter unit (TMTR) 1316 processes the modulated data to generate a downlink modulated signal that is transmitted from an antenna 1318.

At each user terminal 1320x and 1320y, the transmitted and modulated signal is received by an antenna 1352 and provided to a receiver unit (RCVR) 1354. Receiver unit 1354 processes and digitizes the received signal to provide samples. A received (RX) data processor 1356 demodulates and decodes the samples to provide decoded data, which can include recovered traffic data, messages, signaling, and so on. The traffic data can be provided to a data sink 1358, and the carrier assignment and PC commands sent for the terminal are provided to a controller 1360.

Controller 1360 directs data transmission on the uplink using the resources that have been assigned to the terminal and indicated in the received assignment. Controller 1360 further injects the erasure signature packets when there is no actual data to transmit, yet controller 1360 desires to keep the assigned resources.

Controller 1320 directs data transmission on the downlink using the resources that have been assigned to the terminal. Controller 1320 further injects the erasure signature packets when there is no actual data to transmit, yet controller 1360 desires to keep the assigned resources.

For each active terminal 1320, a TX data processor 1374 receives traffic data from a data source 1372 and signaling and other information from controller 1360. For example, controller 1360 can provide information indicative of channel quality information, required transmit power, the maximum transmit power, or the difference between the maximum and required transmit powers for the terminal. The various types of data are coded and modulated by TX data processor 1374 using the assigned carriers and further processed by a transmitter unit 1376 to generate an uplink modulated signal that is transmitted from antenna 1352.

At access point 1310x, the transmitted and modulated signals from the user terminals are received by antenna 1318, processed by a receiver unit 1332, and demodulated and decoded by an RX data processor 1334. Receiver unit 1332 an estimate the received signal quality (e.g., the received signal-to-noise ratio (SNR)) for each terminal and provide this information to controller 1320. Controller 1320 can derive the PC commands for each terminal such that the received signal quality for the terminal is maintained within an acceptable range. RX data processor 1334 provides the recovered feedback information (e.g., the required transmit power) for each terminal to controller 1320 and scheduler 1330.

Scheduler 1330 can provide an indication to controller 1320 to maintain the resources. This indication is provided if more data is scheduled to be transmitted. For the access terminal 1320x, the controller 1360 can determine if resources are required to be maintained. In certain aspects, controller 1320 an perform instructions that provide the functionality of scheduler 1330.

Further, controller 1320 can perform all or some of the functions discussed herein, individually or in any combination with respect to the access point. Further, controller 1360 can perform all or some of the functions discussed herein, individually or in any combination with respect to the access terminal.

Figure 14:
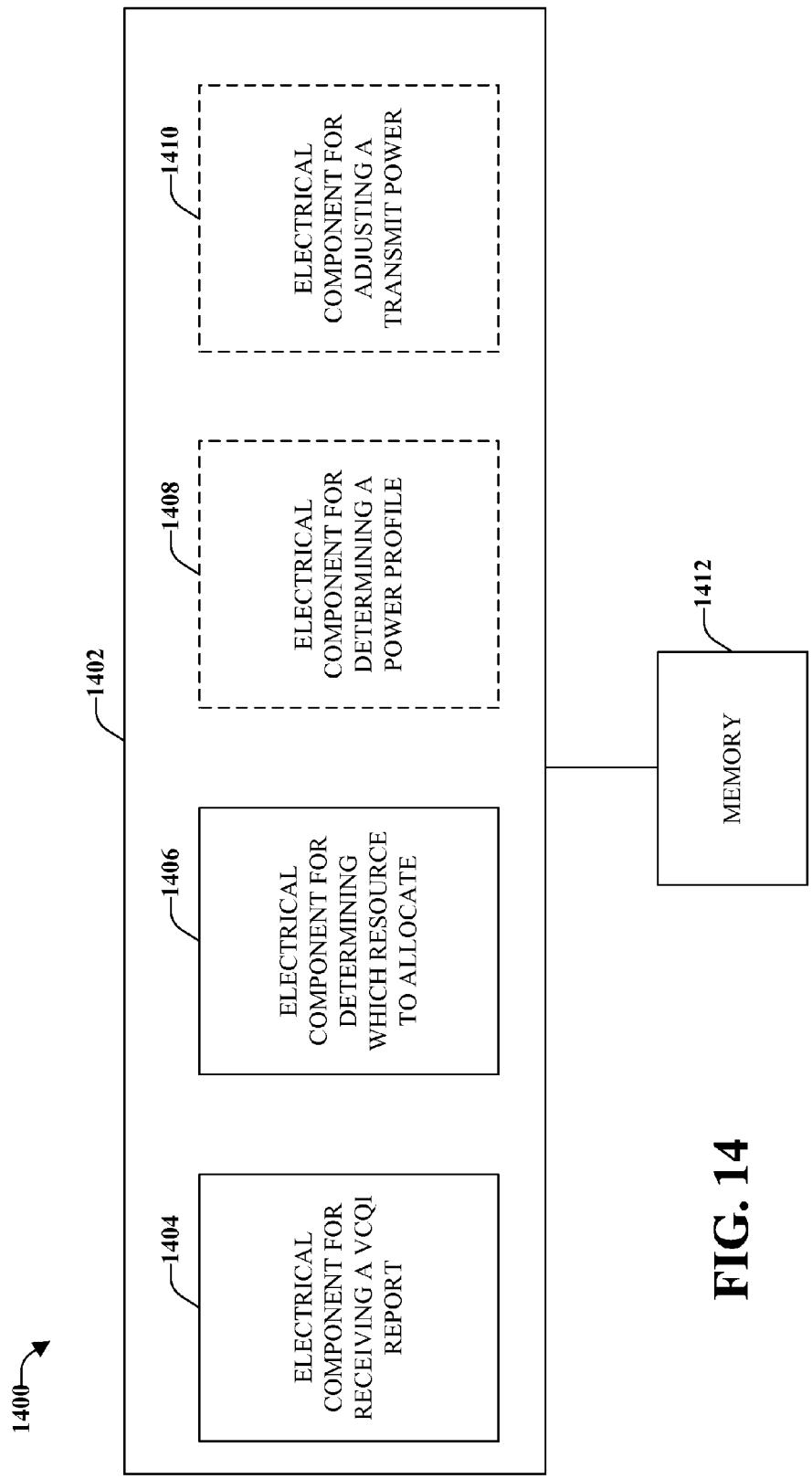
FIG. 14 illustrates a system for enabling resource partitioning in a wireless environment.

FIG. 14 illustrates a system 1400 for enabling resource partitioning in a wireless environment. System 1400 may reside at least partially within a base station. It is to be appreciated that system 1400 is represented as including functional blocks, which may be functional blocks that represent functions implemented by a processor, software, or combination thereof (e.g., firmware).

System 1400 includes a logical grouping 1402 of electrical components that can act separately or in conjunction. Logical grouping 1402 can include an electrical component for receiving a VCQI report from at least one terminal within the wireless communication environment. The terminal can be a terminal that the base station is serving or a terminal that the base station is not serving (e.g., a base station that the terminal might handoff to). The VCQI report can be a SISO report, a MIMO report or a SIMO report. Further, the VCQI report can indicate a channel quality profile. Logical grouping 1402 can also include an electrical component for determining which resource to allocate based on a VCQI profile 1406.

In accordance with some aspects, logical grouping 1402 can include an electrical component for determining a power profile of a base station based on the received VCQI report 1408. Also included can be an electrical component for adjusting a transmit power based on the determined power profile. The power profile can be a profile of the serving (or non-serving) base station that received the VCQI report. The transmit power can be the transmit power of the serving (or non-serving) base station.

System 1400 can include a memory 1412 that retains instructions for executing functions associated with electrical components 1404, 1406, 1408 and 1410 or other components. While shown as being external to memory 1412, it is to be understood that one or more of electrical components 1404, 1406, 1408 and 1410 can exist within memory 1412.

Figure 15:
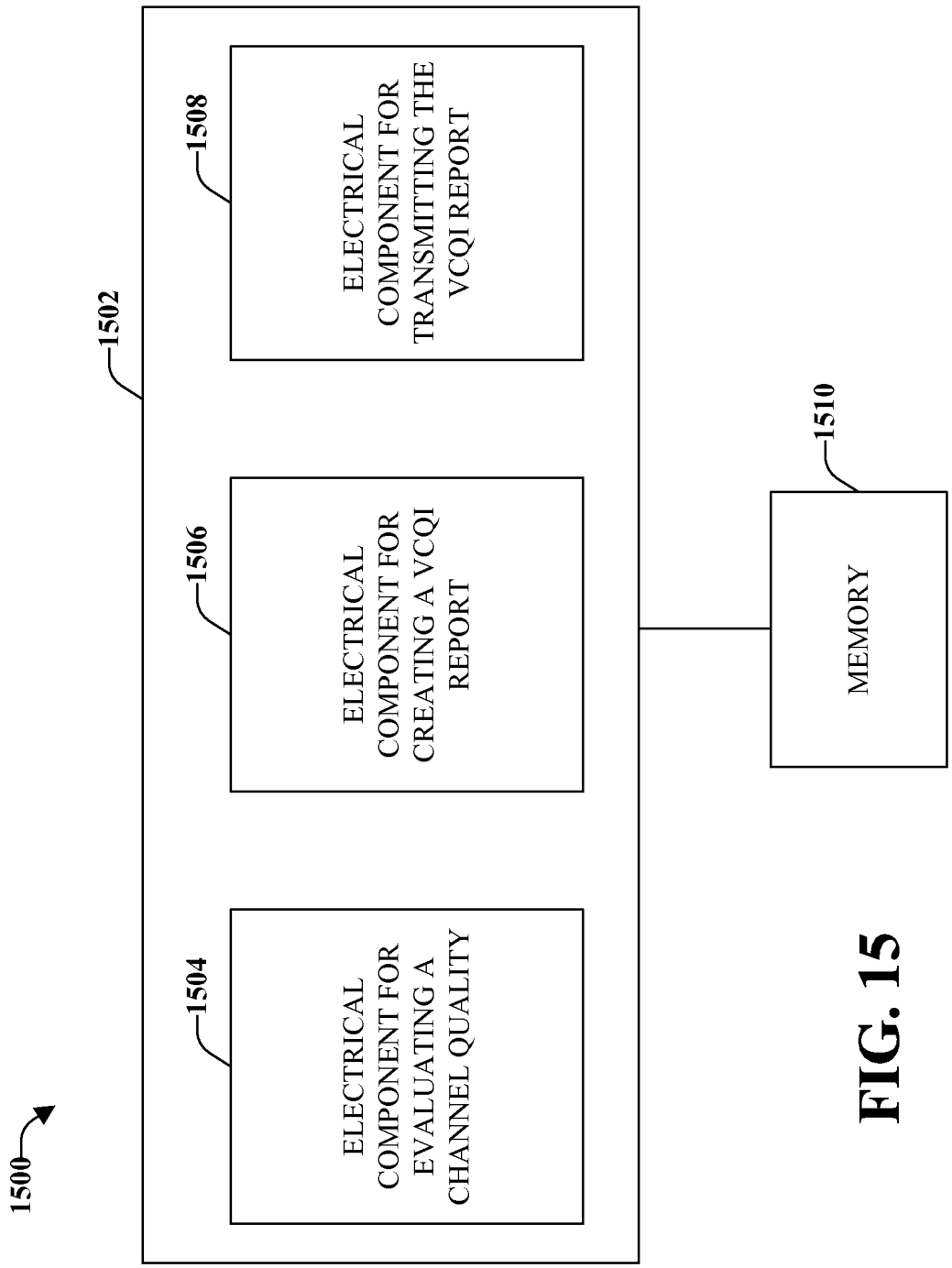
FIG. 15 illustrates a system for transmitting power profile information in a wireless communication environment.

FIG. 15 illustrates a system for transmitting power profile information in a wireless communication environment. System 1500 may reside at least partially within a terminal. It is to be appreciated that system 1500 is represented as including functional blocks, which may be functional blocks that represent functions implemented by a processor, software, or combination thereof (e.g., firmware).

System 1500 includes a logical grouping 1502 of electrical components that can act separately or in conjunction. Logical grouping 1502 can include an electrical component for evaluating a channel quality 1504. Also included is an electrical component for creating a VCQI report that includes the evaluated channel quality information 1506. Further, logical grouping 1502 includes an electrical component for conveying the VCQI report to at least one base station. The base station can be a serving base station or a non-serving base station.

In accordance with some aspects, the VCQI report includes a plurality of signals each corresponding to at least a portion of at least one tile. The logical grouping 1502 can include an electrical component for evaluating a location of at least one null pilot in the tile and an electrical component for ascertaining interference information based upon the at least one null pilot. Additionally, logical grouping 1502 includes an electrical component for determining an interlace on which the signal is received and an electrical component for deciding whether to ascertain the location based upon the interlace.

System 1500 can include a memory 1510 that retains instructions for executing functions associated with electrical components 1504, 1506, and 1508 or other components. While shown as being external to memory 1510, it is to be understood that one or more of electrical components 1504, 1506, and 1508 can exist within memory 1510.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for enabling resource partitioning in a wireless communication system, comprising:
   receiving a vectorized channel quality indicator (VCQI) report from a terminal within the wireless communication system; and
   determining a target reuse set to allocate based on the VCQI report,
   wherein the VCQI report includes average channel quality information that is measured by the terminal on a plurality of sectors and reported at a lower frequency relative to an instantaneous channel quality reporting interval of the terminal and is received by a non-serving base station of the terminal via backhaul signaling.

2. The method of claim 1, wherein the VCQI report is received by a serving base station.

3. The method of claim 1, wherein the VCQI report is a single-input single-output (SISO) report, a multiple-input multiple-output (MIMO) report or a single-input multiple-output (SIMO) report.

4. The method of claim 1, wherein the VCQI report indicates a channel quality profile.

5. The method of claim 1, further comprises determining a power profile of the non-serving base station based on the received VCQI report.

6. The method of claim 5, further comprises adjusting a transmit power of the non-serving base station based on the determined power profile.

7. The method of claim 1, wherein the VCQI report includes channel quality information related to a plurality of channels in one or more reuse sets measured by terminal.

8. The method of claim 7, wherein the channel quality information related to the plurality of channels in the one or more reuse sets includes the average channel quality, wherein the average channel quality is for the plurality of channels in the one or more reuse sets.

9. The method of claim 1, wherein the plurality of sectors includes each sector in an active set of the terminal.

10. The method of claim 1, wherein the plurality of sectors includes the non-serving sector at which the VCQI report is received via the backhaul signaling.

11. The method of claim 1,
   wherein the average channel quality information characterizes channel quality on each of a plurality of different reuse sets, and
   wherein the determining selects the target reuse set for the terminal upon handoff to the non-serving base station.

12. The method of claim 1, wherein the instantaneous channel quality reporting interval is a CQI reporting interval.

13. A wireless communications apparatus, comprising:
   a processor that executes instructions for accepting profile information from a terminal via backhaul signaling and determining a target reuse set to assign based on the profile information; and
   a memory that stores information generated by the processor,
   wherein the profile information includes average channel quality information that is measured by the terminal on a plurality of sectors and reported at a lower frequency relative to an instantaneous channel quality reporting interval of the wireless communications apparatus, and
   wherein the wireless communications apparatus is a non-serving base station of the terminal.

14. The wireless communications apparatus of claim 13, wherein the profile information includes a VCQI report.

15. The wireless communications apparatus of claim 14, wherein the VCQI report is a SISO report, a MIMO report or a SIMO report.

16. The wireless communications apparatus of claim 13, the processor further executes instructions for determining a power profile of the apparatus based on the profile information.

17. The wireless communications apparatus of claim 16, the processor further executes instructions for adjusting a transmit power based on the determined power profile.

18. A wireless communications apparatus that facilitates resource planning in a wireless communication system, comprising:
   means for receiving a VCQI report from a terminal within the wireless communication system via backhaul signaling; and
   means for determining a target reuse set to allocate based on the VCQI report,
   wherein the VCQI report includes average channel quality information that is measured by the terminal on a plurality of sectors and reported at a lower frequency relative to an instantaneous channel quality reporting interval of the wireless communications apparatus, and
   wherein the wireless communications apparatus is a non-serving base station of the terminal.

19. The wireless communications apparatus claim 18, wherein the VCQI report is a SISO report, a MIMO report or a SIMO report.

20. The wireless communications apparatus claim 18, wherein the VCQI report indicates a channel quality profile.

21. The wireless communications apparatus claim 18, further comprises means for determining a power profile of the non-serving base station based on the VCQI report.

22. The wireless communications apparatus claim 21, further comprises means for adjusting a transmit power of the non-serving base station based on the determined power profile.

23. A non-transitory computer-readable medium having instructions stored thereon, which, when executed by a non-serving base station of a terminal, cause the non-serving base station to perform operations, the instructions comprising:
   receiving profile information from the terminal, wherein the profile information is included in a VCQI report; and
   assigning a target reuse set based on the profile information,
   wherein the profile information includes average channel quality information that is measured by the terminal on a plurality of sectors and reported at a lower frequency relative to an instantaneous channel quality reporting interval of the terminal and is received by the non-serving base station of the terminal via backhaul signaling.

24. The non-transitory computer-readable medium of claim 23, wherein the VCQI report is a SISO report, a MIMO report or a SIMO report.

25. The non-transitory computer-readable medium of claim 23, the instructions further are for:
- determining a power profile of the non-serving base station based on the profile information; and
- adjusting a transmit power of the non-serving base station based on the determined power profile.

26. An apparatus operable in a wireless communication system, the apparatus comprising:
- a processor configured to:
- receive a VCQI report from a terminal via backhaul signaling;
- allocate a target reuse set based on the VCQI report;
- determine a power profile of the apparatus based on the VCQI report; and
- adjust a transmit power of the apparatus based on the determined power profile,
- wherein the VCQI report includes average channel quality information that is measured by the terminal on a plurality of sectors and reported at a lower frequency relative to an instantaneous channel quality reporting interval of the terminal, and
- wherein the apparatus is a non-serving base station of the terminal.

* * * * *